US011895533B2

(12) United States Patent
Guo et al.

(10) Patent No.: US 11,895,533 B2
(45) Date of Patent: Feb. 6, 2024

(54) METHOD FOR CONTROLLING CONNECTION BETWEEN TERMINAL AND NETWORK, AND RELATED APPARATUS

(71) Applicant: HUAWEI TECHNOLOGIES CO., LTD., Shenzhen (CN)

(72) Inventors: Longhua Guo, Shanghai (CN); Li Hu, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 17/245,341

(22) Filed: Apr. 30, 2021

(65) Prior Publication Data

US 2021/0250811 A1 Aug. 12, 2021

Related U.S. Application Data

(63) Continuation of application No. PCT/CN2019/114792, filed on Oct. 31, 2019.

(30) Foreign Application Priority Data

Nov. 2, 2018 (CN) .......................... 201811302742.4

(51) Int. Cl.
*H04W 28/00* (2009.01)
*H04W 28/06* (2009.01)
(Continued)

(52) U.S. Cl.
CPC ....... *H04W 28/06* (2013.01); *H04W 28/0268* (2013.01); *H04W 28/0925* (2020.05); *H04W 76/30* (2018.02)

(58) Field of Classification Search
CPC ....... H04L 47/125; H04L 47/32; H04L 63/02; H04L 63/1458; H04L 67/34;
(Continued)

(56) References Cited

U.S. PATENT DOCUMENTS

2005/0165917 A1* 7/2005 Le .................. H04L 63/0236
709/220
2013/0188491 A1* 7/2013 Ludwig ............. H04W 28/0252
370/235
(Continued)

FOREIGN PATENT DOCUMENTS

CN  101674606 A   3/2010
CN  102325350 B   10/2014
(Continued)

OTHER PUBLICATIONS

3GPP TR 33.861 V0.3.0. 3rd Generation Partnership Project; Technical Specification Group Services and System Aspects; Study on evolution of Cellular IoT security for the 5G System (Release 16), 24 pages, Nov. 2018.*
(Continued)

*Primary Examiner* — Frank Duong
(74) *Attorney, Agent, or Firm* — Rimon PC

(57) ABSTRACT

This application provides a method for controlling a connection between a terminal and a network, and an apparatus. The method includes: receiving, by a terminal, a packet filter; and discarding, by the terminal, an uplink data packet matching the packet filter. Based on this solution, a connection can be blocked near a source (that is, the connection is blocked from the terminal), to reduce traffic exchanged between the terminal and a user plane network element. Compared with an existing technical solution, the terminal implements traffic control to reduce a quantity of uplink data packets sent to the user plane network element, thereby reducing load of the user plane network element.

14 Claims, 6 Drawing Sheets

(51) Int. Cl.
*H04W 76/30* (2018.01)
*H04W 28/08* (2023.01)
*H04W 28/02* (2009.01)

(58) Field of Classification Search
CPC .............. H04L 63/1483; H04W 28/06; H04W 28/0268; H04W 28/0925; H04W 76/30; H04W 76/32; H04W 12/122
See application file for complete search history.

(56) References Cited

U.S. PATENT DOCUMENTS

| | | | |
|---|---|---|---|
| 2017/0324652 | A1 | 11/2017 | Lee et al. |
| 2018/0234876 | A1* | 8/2018 | Jheng .................... H04W 28/26 |
| 2018/0376384 | A1* | 12/2018 | Youn ................ H04W 36/0022 |
| 2019/0028920 | A1* | 1/2019 | Pan .......................... H04L 47/24 |
| 2019/0029057 | A1* | 1/2019 | Pan ........................ H04W 76/10 |
| 2021/0160730 | A1* | 5/2021 | Fiorani ............. H04W 28/0268 |
| 2021/0306912 | A1* | 9/2021 | Stojanovski .......... H04W 76/10 |

FOREIGN PATENT DOCUMENTS

| | | |
|---|---|---|
| CN | 104735093 A | 6/2015 |
| CN | 106717051 A | 5/2017 |
| CN | 108156633 A | 6/2018 |
| CN | 108702724 A | 10/2018 |
| CN | 107667509 B | 4/2021 |
| WO | 2018070689 A1 | 4/2018 |
| WO | 2018126488 A1 | 7/2018 |

OTHER PUBLICATIONS

Zhang et al., System Functional Requirements and Architecture, Deliverable D2.2, IoRL, 159 pages, Jul. 19, 2018.*
SA WG2 Meeting #S2-122bis,S2-175419,Clarification for uplink QFI verficiation,Samsung, Aug. 21-25, 2017, Sophia Antipolis, France,total 9 pages.
Huawei et al: "Support QoS Differentiation for Unstructured POU Session",3GPP Draft; S2-184411,Apr. 19, 2018, XP051432792,total 9 pages.
3gpp: "3rd Generation Partnership Project; Technical Specification Group Services and System Aspects; System Architecture for the 5G System; Stage 2 (Release 15)",3GPP TS 23.501 V1.4.0, Sep. 1, 2017 (Sep. 1, 2017), pp. 2017-2019, XP055594994,total 151 pages.
NSN: "Corrections to handling of PCC rules with application identifier", 3GPP DRAFT; C3-140151-29212-REL 11-SAPP-CORRECTIONS, Jan. 20, 2014,XP050731892,total 6 pages
3GPP TSG-CT WG1 Meeting #111bis,C1-184060:"5G QoS—restructuring QoS rules IE",Ericsson, Qualcomm Incorporated, MediaTek Inc.Sophia-Antipolis (France), Jul. 9-13, 2018,total 27 pages.
3GPP TS 23.501 V15.3.0:"3rd Generation Partnership Project;Technical Specification Group Services and System Aspects;System Architecture for the 5G System;Stage 2(Release 15)",Sep. 2018,total 225 pages.
3GPP TS 23.502 V15.3.0:"3rd Generation Partnership Project;Technical Specification Group Services and System Aspects;Procedures for the 5G System;Stage 2(Release 15)",Sep. 2018,total 253 pages.
3GPP TS 23.503 V15.3.0."3rd Generation Partnership Project; Technical Specification Group Services and System Aspects;Policy and Charging Control Framework for the 5G System;Stage 2(Release 15)",Sep. 2018,total 69 pages.

* cited by examiner

METHOD FOR CONTROLLING CONNECTION BETWEEN TERMINAL AND NETWORK, AND RELATED APPARATUS

CROSS-REFERENCE TO RELATED APPLICATIONS

This application is a continuation of International Patent Application No. PCT/CN2019/114792, filed on Oct. 31, 2019, which claims priority to Chinese Patent Application No. 201811302742.4, filed on Nov. 2, 2018. The disclosures of the aforementioned applications are hereby incorporated by reference in their entireties.

TECHNICAL FIELD

This application relates to the field of mobile communications technologies, and in particular, to a method for controlling a connection between a terminal and a network, and an apparatus.

BACKGROUND

In some service scenarios, some terminals, which are usually easy to implement and have poor security protection, are vulnerable to attacks and become devices controlled by attackers. An example of an attack is that an attacker can quickly control a large quantity of terminals by using virus software, to form a botnet controlled by the attacker. When the scale of the quantity of terminals reaches a specific value, the attacker can control these terminals to simultaneously initiate a large quantity of connections to a server. Consequently, the server is overloaded and breaks down, and a distributed denial of service (DDoS) attack is caused.

Currently, a method for controlling a terminal attack is as follows: If detecting that a terminal abnormally accesses an internet protocol (IP) address, for example, the terminal accesses the IP address for a large quantity of times within a short period of time, and is suspected of having an attack behavior, a network side generates a control policy and delivers the control policy to a user plane network element. Subsequently, when receiving an uplink data packet of the terminal, the user plane network element performs matching on the uplink data packet according to the control policy. If the matching succeeds, the user plane network element discards the uplink data packet, to prevent the terminal from accessing the IP address.

The foregoing method has the following disadvantage: When a DDoS occurs, there are tens of thousands of terminals having an abnormal behavior, resulting in extremely high user-plane traffic overheads.

SUMMARY

This application provides a method for controlling a connection between a terminal and a network, and an apparatus, to reduce user-plane traffic overheads caused by an abnormal behavior of a terminal.

According to a first aspect, this application provides a method for controlling a connection between a terminal and a network, including: A terminal receives a packet filter. Then, the terminal discards an uplink data packet matching the packet filter. Based on this solution, a connection can be blocked near a source (that is, the connection is blocked from the terminal), to reduce traffic exchanged between the terminal and a user plane network element. Compared with the technical solution in the background, in this embodiment, the terminal implements traffic control, to reduce a quantity of uplink data packets sent to the user plane network element, thereby reducing load of the user plane network element.

In a possible implementation, the terminal receives the packet filter and indication information, where the indication information is used to indicate to discard the uplink data packet matching the packet filter. The terminal allocates a specific quality of service flow identity (QFI) to the packet filter based on the indication information. Then, the terminal marks the uplink data packet with the specific QFI if determining that the uplink data packet matches the packet filter. Afterwards, the terminal discards the uplink data packet corresponding to the specific QFI. Based on this solution, the uplink data packet is marked with the specific QFI, and subsequently, the uplink data packet corresponding to the specific QFI is discarded, so that sending of the uplink data packet is controlled on the terminal.

In a possible implementation, the indication information is a specific 5G quality of service indicator (5QI), and the specific QFI is the specific 5QI or the specific QFI is generated based on the specific 5QI.

In a possible implementation, the terminal may further update a quality of service (QoS) rule of the terminal based on the packet filter and the specific QFI after allocating the specific QFI to the packet filter based on the indication information. The terminal sends notification information to an access network device when each QFI corresponding to a packet filter in the updated QoS rule is the specific QFI, where the notification information is used to indicate to release a PDU session. Because all packet filters correspond to the specific QFI, all uplink data packets are discarded. Therefore, the terminal can directly release the PDU session.

In a possible implementation, the terminal may further start a timer after the terminal allocates the specific QFI to the packet filter based on the indication information. The terminal initiates a PDU session modification procedure after the timer expires, to request to allocate an access network resource to a quality of service QoS flow indicated by the specific QFI, where the allocated access network resource is used to transmit a data packet of the QoS flow. In this way, sending of the uplink data packet can be limited within specific duration.

In still another possible implementation, that the terminal receives a packet filter specifically includes: The terminal receives a non-access stratum NAS message from a mobility management network element, where the NAS message includes the packet filter. Based on this solution, the packet filter is sent to the terminal by using the NAS message.

In still another possible implementation, that the terminal receives a packet filter specifically includes: The terminal receives a broadcast message from an access network device, where the broadcast message includes a group identifier and the packet filter. That the terminal discards an uplink data packet matching the packet filter specifically includes: The terminal discards, if determining that a group identifier of the terminal matches the group identifier of the broadcast message, the uplink data packet matching the packet filter. Based on this solution, a network side can control sending of uplink data packets of one or more groups of terminals by group, thereby reducing signaling overheads on the network side.

According to a second aspect, this application provides a method for controlling a connection between a terminal and a network, including: A policy control network element generates a packet filter. The policy control network element sends the packet filter to a terminal, to indicate the terminal to discard an uplink data packet matching the packet filter. Based on this solution, a connection can be blocked near a source (that is, the connection is blocked from the terminal), to reduce traffic exchanged between the terminal and a user plane network element. Compared with the technical solution in the background, in this embodiment, the terminal implements traffic control, to reduce uplink data packets sent to the user plane network element, thereby reducing load of the user plane network element.

In a possible implementation, the policy control network element may receive a control policy and a group identifier from a security detection network element before sending the packet filter to the terminal. That a policy control network element generates a packet filter specifically includes: The policy control network element generates the packet filter based on the control policy. That the policy control network element sends the packet filter to a terminal specifically includes: The policy control network element sends the packet filter and the group identifier to the terminal, to indicate the terminal to discard, when the group identifier matches a group identifier of the terminal, the uplink data packet matching the packet filter. Based on this solution, a network side can control sending of uplink data packets of one or more groups of terminals by group, thereby reducing signaling overheads on the network side.

According to a third aspect, this application provides a method for controlling a connection between a terminal and a network, including: An access network device receives a packet filter and a group identifier. The access network device sends a broadcast message to a terminal, where the broadcast message includes the packet filter and the group identifier, and the broadcast message is used to indicate the terminal to discard, when the group identifier matches a group identifier of the terminal, an uplink data packet matching the packet filter. Based on this solution, sending of uplink data packets of one or more groups of terminals can be controlled by group, thereby reducing signaling overheads on a network side.

In a possible implementation, the access network device may receive the packet filter and the group identifier from a policy control network element.

According to a fourth aspect, this application provides an apparatus. The apparatus may be a terminal, a policy control network element, or an access network device, or may be a chip. The apparatus has a function of implementing each embodiment of any one of the first aspect, the second aspect, or the third aspect. The function may be implemented by hardware, or may be implemented by hardware by executing corresponding software. The hardware or the software includes one or more modules corresponding to the function.

According to a fifth aspect, an apparatus is provided, including a processor and a memory. The memory is configured to store a computer-executable instruction. When the apparatus runs, the processor executes the computer-executable instruction stored in the memory, to enable the apparatus to perform the method for controlling a connection between a terminal and a network according to any one of the first aspect or the possible implementations of the first aspect, or to enable the apparatus to perform the method for controlling a connection between a terminal and a network according to any one of the second aspect or the possible implementations of the second aspect, or to enable the apparatus to perform the method for controlling a connection between a terminal and a network according to any one of the third aspect or the possible implementations of the third aspect.

According to a sixth aspect, this application further provides a computer-readable storage medium. The computer-readable storage medium stores instructions. When the instructions are run on a computer, the computer is enabled to perform the method in the foregoing aspects.

According to a seventh aspect, this application further provides a computer program product including instructions. When the computer program product runs on a computer, the computer is enabled to perform the method according to the foregoing aspects.

DESCRIPTION OF EMBODIMENTS

To make objectives, technical solutions, and advantages of this application clearer, the following further describes this application in detail with reference to the accompanying drawings. A specific operation method in a method embodiment may also be used in an apparatus embodiment or a system embodiment. In descriptions of this application, unless otherwise stated, "a plurality of" refers to two or more than two.

A network architecture and a service scenario described in embodiments of this application are intended to describe the technical solutions in the embodiments of this application more clearly, and do not constitute a limitation on the technical solutions provided in the embodiments of this application. A person of ordinary skill in the art may be aware that: With evolution of the network architecture and emergence of new service scenarios, the technical solutions provided in the embodiments of this application are also applicable to similar technical problems.

Figure 1:
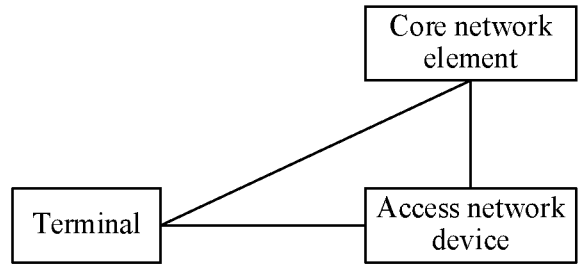
FIG. 1 is a schematic diagram of a possible reference network architecture according to this application.

FIG. 1 is a schematic diagram of a possible reference network architecture according to this application. The reference network architecture includes an access network device and a core network element. The access network device may communicate with a terminal in a wired or wireless manner. The terminal may communicate with the core network element by using a non-access stratum (NAS) message, for example, through an N1 interface.

The core network element may include some or all of a mobility management network element, a session management network element, a policy control network element, a user plane network element, and a security detection network element.

In this application, the terminal is a device having a wireless transceiver function. The terminal may be deployed on land, including an indoor device, an outdoor device, a handheld device, or a vehicle-mounted device, or may be deployed on water (for example, on a ship), or may be deployed in the air (for example, on an aircraft, a balloon, and a satellite). The terminal may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, or a wireless terminal in a smart home, and may further include user equipment (UE) and the like. Alternatively, the terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5th generation (5G) network, a terminal device in a future evolved public land mobile network (PLMN), or the like. The terminal sometimes may also be referred to as a terminal device, user equipment (UE), an access terminal device, a vehicle-mounted terminal, an industrial control terminal, a UE unit, a UE station, a mobile station, a remote station, a remote terminal device, a mobile device, a wireless communications device, a UE agent, a UE apparatus, or the like. The terminal may be fixed or mobile. This is not limited in the embodiments of this application.

The access network device may also be referred to as a radio access network (RAN) device, and is a device that provides a wireless communication function for a terminal. For example, the access network device includes but is not limited to: a next-generation base station (g nodeB, gNB) in 5G, an evolved NodeB (eNB), a radio network controller (RNC), a NodeB (NB), a base station controller (BSC), a base transceiver station (BTS), a home base station (for example, a home evolved nodeB or a home node B, HNB), a baseband unit (BBU), a transmission point (TRP), a transmitting point (TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a wearable device, a network device in a future 5G network, a network device in a future evolved PLMN network, or the like. The terminal may communicate with a plurality of access network devices using different technologies. For example, the terminal may communicate with an access network device supporting a long term evolution (LTE) network, or may communicate with an access network device supporting a 5G network, and may further support dual connectivity with the access network device in the LTE network and the access network device in the 5G network. This is not limited in the embodiments of this application.

The user plane network element is mainly responsible for processing a user packet. The processing is, for example, forwarding, charging, or lawful interception. In a 5G network, the user plane network element may be a user plane function (UPF) network element. In future communication, for example, in a 6th generation (6G) network, the user plane network element may still be a UPF network element or have another name. This is not limited in this application.

The session management network element is mainly used for session management, for example, session creation, modification, or release, in a mobile network. Specific functions include, for example, allocating an IP address to a user and selecting a user plane network element that provides a packet forwarding function. In a 5G network, the session management network element may be a session management function (SMF) network element. In future communication, for example, in a 6G network, the session management network element may still be an SMF network element or have another name. This is not limited in this application.

The mobility management network element is mainly used for terminal registration, mobility management, and a tracking area update procedure in a mobile network. The mobility management network element terminates a NAS message, completes registration management, connection management, reachability management, tracking area list (TA list) allocation, mobility management, and the like, and transparently routes a session management (SM) message to the session management network element. In a 5G network, the mobility management network element may be an access and mobility management function (AMF) network element. In future communication, for example, in a 6G network, the mobility management network element may still be an AMF network element or have another name. This is not limited in this application.

The policy control network element has a user subscription information management function, a policy control function, a charging policy control function, a quality of service (QoS) control function, and the like. In a 5G network, the policy control network element may be a policy control function (PCF) network element. In future communication, for example, in a 6G network, the policy control network element may still be a PCF network element or have another name. This is not limited in this application.

The security detection network element in this application has a security function, and may analyze traffic data of terminals and detect malicious traffic, that is, detect a terminal that has an abnormal behavior. During specific implementation, in 5G, the security detection network element may be referred to as a security detection function (SEDF) network element, or have another name. During specific implementation, the security detection network element may be an independent network element, or integrated into a network data analysis function (NWDAF) entity, or integrated into an operation, administration and maintenance (OAM) entity, or integrated into an application function (AF) entity. The OAM entity may also be referred to as a network management system, and is configured to provide a group of network management functions, including fault monitoring, fault reporting, fault diagnosis, fault rectification, and the like. The NWDAF entity is configured to provide a big data analysis service, and the entity may collect data from a 3rd generation partnership project (3GPP) network and perform big data analysis, to provide a better policy. The AF entity is configured to provide an application service, and the application service may be provided by a third party or an operator.

It may be understood that the foregoing functions may be network elements in a hardware device, software functions running on dedicated hardware, or virtualized functions instantiated on a platform (for example, a cloud platform).

For ease of description, in this application, an example in which the terminal is UE, the access network device is a base station, the user plane network element is a UPF network element, the session management network element is an SMF network element, the mobility management network element is an AMF network element, the policy control network element is a PCF network element, and the security detection network element is an SEDF network element is used for description subsequently. Further, the UPF network element is referred to as a UPF for short, the session management network element is referred to as an SMF for short, the AMF network element is referred to as an AMF for short, the PCF network element is referred to as a PCF for short, and the SEDF network element is referred to as an SEDF for short. That is, in this application, all UPFs described subsequently may be replaced with the user plane network element, all SMFs may be replaced with the session management network element, all AMFs may be replaced with the mobility management network element, all SEDFs may be replaced with the security detection network element, all UEs may be replaced with the terminal, and all base stations may be replaced with the access network device. The description is provided herein, and details are not described subsequently.

5G is mainly oriented to three major service scenarios: enhanced mobile broadband (eMBB), enhanced machine type communication (eMTC), and ultra-reliable and low-latency communication (URLLC). eMTC is mainly oriented to internet of things (IoT) devices. These devices, which are usually easy to implement and have poor security protection, are vulnerable to attacks and become devices controlled by attackers.

An example of an attack is that an attacker can quickly control a large quantity of IoT devices by using virus software, to form a botnet controlled by the attacker. When the scale of the quantity of IoT devices reaches a specific value, the attacker can control these devices to simultaneously initiate a large quantity of connections to a server. Consequently, the server is overloaded and breaks down, and a DDoS attack is caused.

Therefore, when a server is under a DDoS attack, a terminal that initiates the attack needs to be controlled to restrict access of the terminal to a target service, but a normal connection between the terminal and another server is not interrupted.

Figure 2:
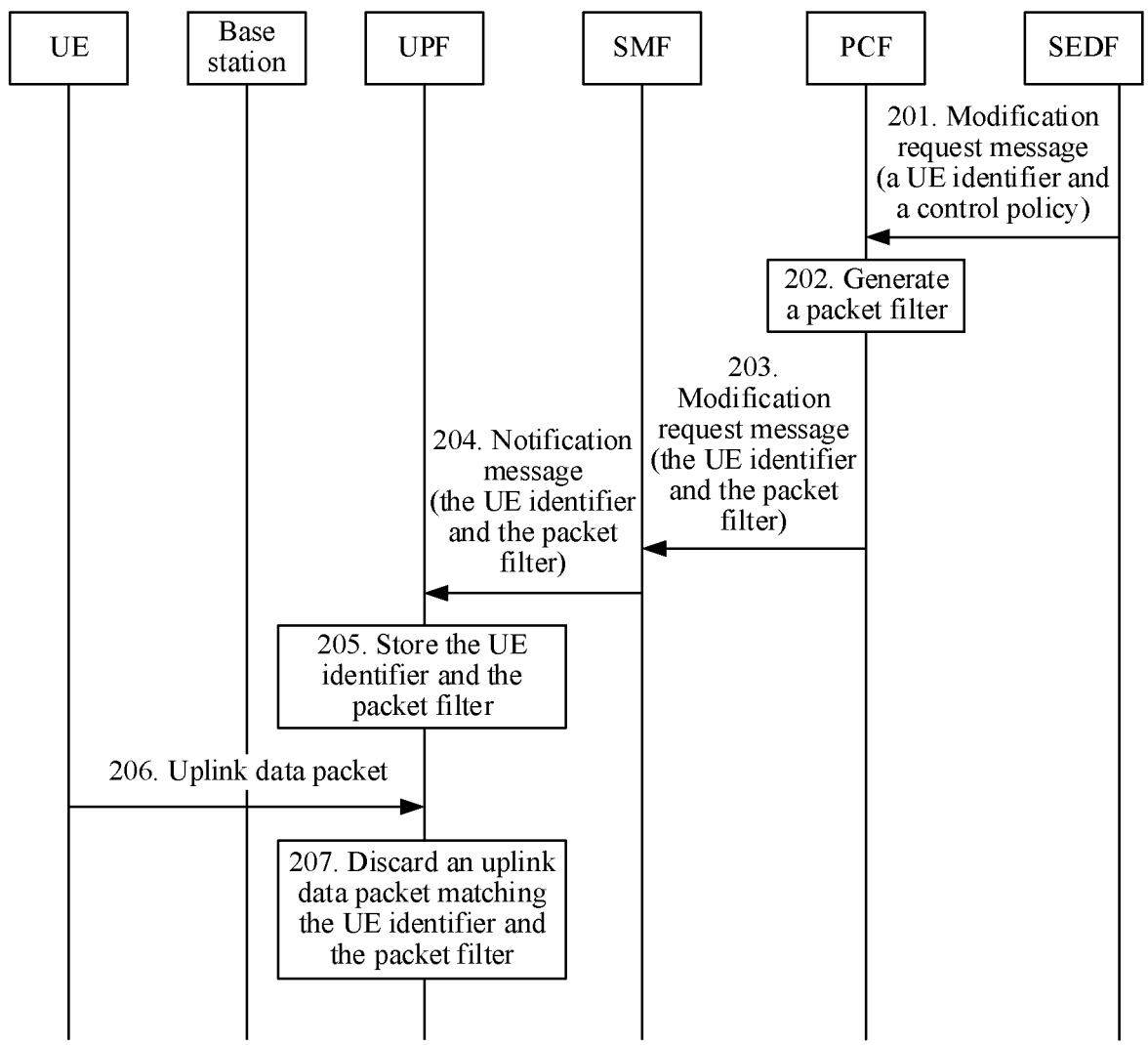
FIG. 2 is a schematic diagram of a method for controlling a connection between a terminal and a network in a current technology.

FIG. 2 is a schematic flowchart of a method for controlling a connection between a terminal and a network in a current technology. The method includes the following steps.

Step 201. An SEDF sends a modification request message to a PCF when the SEDF detects a security event.

That the SEDF detects a security event means that the SEDF detects that UE or some UEs abnormally accesses/access an IP address or some IP addresses, for example, the UE or some UEs frequently accesses/access an IP address within a short period of time, and is/are suspected of having an attack behavior, and in this way, the SEDF determines that there is the security event.

The modification request message includes a UE identifier (UE ID) and a control policy. The UE identifier is used to indicate identity information of the UE, and the control policy is used to limit a data connection of the UE to a destination IP address or a destination medium access control (MAC) address. The control policy includes the destination IP address or the destination MAC address. Optionally, the control policy may further include a source IP address or a source MAC address.

Step 202. The PCF generates a packet filter.

The PCF generates the packet filter based on the received control policy. For example, the generated packet filter may include an IP packet filter and a MAC packet filter. The IP packet filter includes the destination IP address, and the destination IP address is from the control policy. Optionally, the PCF may further add some or all information of the source IP address, a source port number, a destination port number, and a protocol type to the IP packet filter. The MAC packet filter includes the destination MAC address, and the destination MAC address is from the control policy. Optionally, the PCF may further add some or all of information of the source MAC address, the source port number, the destination port number, and the protocol type to the MAC packet filter.

Step 203. The PCF sends a modification request message to an SMF, where the message includes the UE identifier and the packet filter.

Step 204. The SMF sends a notification message to a UPF, where the message includes the UE identifier and the packet filter.

Step 205. The UPF stores the UE identifier and the packet filter.

Step 206. The UE sends an uplink data packet to the UPF.

Step 207. The UPF discards an uplink data packet matching the stored UE identifier and packet filter.

In an example, the UE identifier and the packet filter that are received by the UPF in step 204 are (a UE ID 1, a packet filter 1, and a packet filter 2), (a UE ID 2, a packet filter 3, and a packet filter 4), or (a UE ID 3 and a packet filter 5). The UE ID 1 is used to identify UE 1, the UE ID 2 is used to identify UE 2, and the UE ID 3 is used to identify UE 3.

For example, when the UPF receives an uplink data packet 1 from the UE 1, if the UPF successfully matches the uplink data packet 1 with the packet filter 1 or the packet filter 2, the UPF discards the uplink data packet 1. For another example, when the UPF receives an uplink data packet 2 from the UE 2, if the UPF successfully matches the uplink data packet 2 with the packet filter 3 or the packet filter 4, the UPF discards the uplink data packet 2.

In the current technology, the UE sends the uplink data packet to the UPF, and the UPF performs traffic control on the uplink data packet based on the received UE identifier and packet filter. A main disadvantage of the method is that when a DDoS attack occurs, there are tens of thousands of UEs having an abnormal behavior, resulting in high overheads of signaling and user-plane traffic (that is, traffic on the UPF), that is, air interface resources between the UE and a base station and link resources between the base station and the UPF are wasted.

Figure 3:
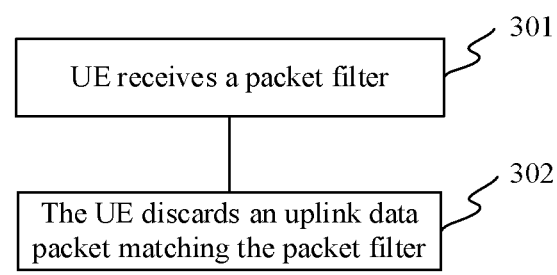
FIG. 3 is a schematic diagram of a method for controlling a connection between a terminal and a network according to this application.

To resolve the foregoing problem, this application provides a method for controlling a connection between UE and a network. FIG. 3 shows a method for controlling a connection between UE and a network according to this application. The method includes the following steps.

Step 301. UE receives a packet filter.

The packet filter herein may be the same as the packet filter in the embodiment shown in FIG. 2.

Step 302. The UE discards an uplink data packet matching the packet filter.

Based on this embodiment, a connection can be blocked near a source (that is, the connection is blocked from the UE), to reduce traffic exchanged between the UE and a UPF. Compared with the background technical solution shown in FIG. 2, in this embodiment of this application, the UE implements traffic control, to reduce a quantity of uplink data packets sent to the UPF, thereby reducing load of the UPF.

The following specifically describes the embodiment shown in FIG. 3 with reference to a specific application scenario.

In an implementation method 1, the UE receives the packet filter and indication information from a network side, where the indication information is used to indicate to discard the uplink data packet matching the packet filter. The UE allocates a specific QoS flow identifier (QFI) to the packet filter based on the indication information. After generating the uplink data packet, if determining that the uplink data packet matches the packet filter, the UE marks the uplink data packet with the specific QFI. Subsequently, the UE discards the uplink data packet marked with the specific QFI.

Based on this implementation method, the UE marks the uplink data packet matching the packet filter with one specific QFI, and subsequently the UE discards the uplink data packet corresponding to the specific QFI.

The following provides a specific embodiment of this implementation method with reference to an accompanying drawing.

Figure 4:
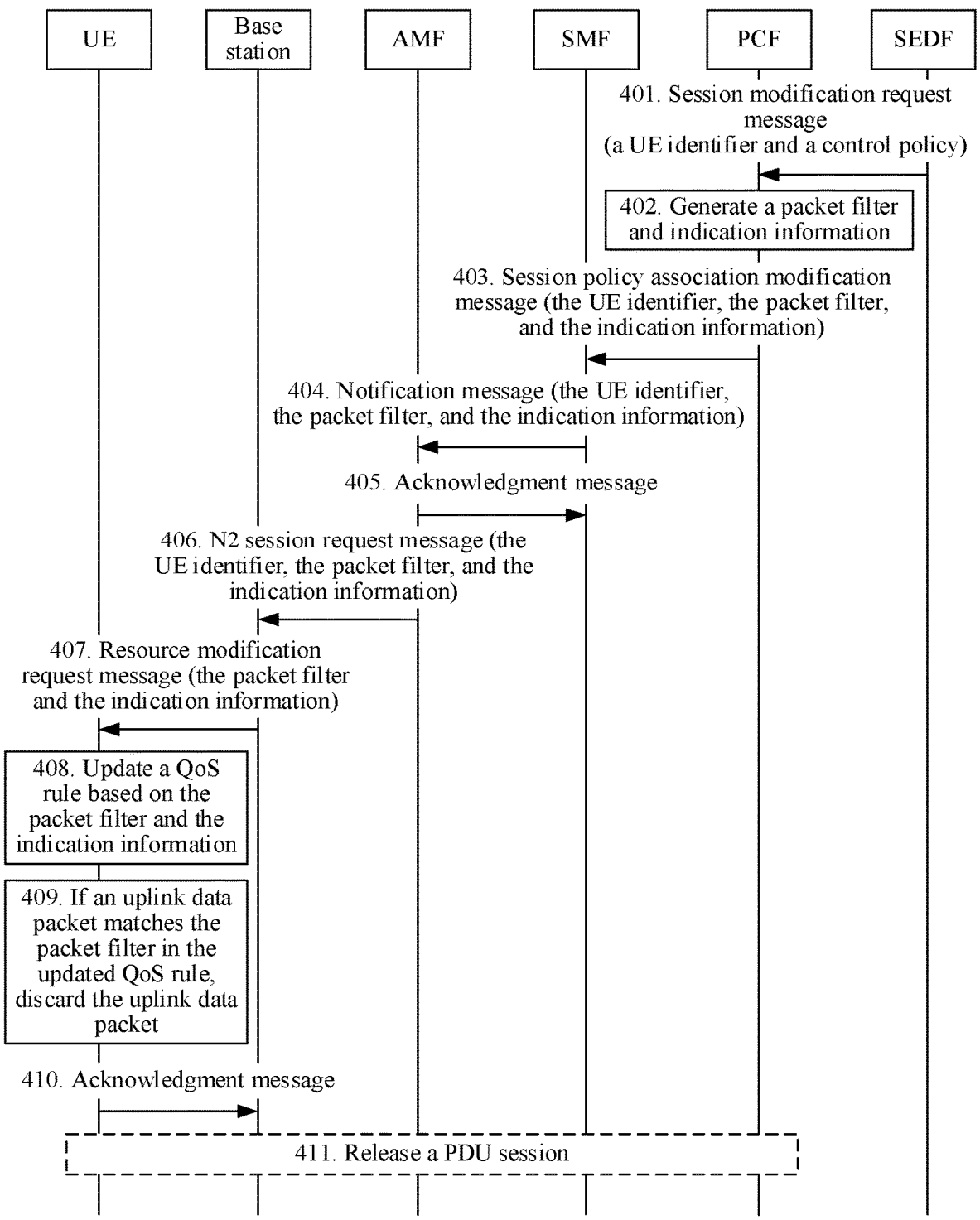
FIG. 4 is a schematic diagram of still another method for controlling a connection between a terminal and a network according to this application.

FIG. 4 shows another method for controlling a connection between UE and a network according to this application. In the method, single UE may be controlled in a protocol data unit (PDU) session modification procedure.

The method includes the following steps.

Step 401. An SEDF sends a session modification request message to a PCF when the SEDF detects a security event.

That the SEDF detects a security event means that, for example, the SEDF detects that UE or some UEs abnormally accesses/access an IP address or some IP addresses, for example, the UE or some UEs frequently accesses/access an IP address within a short period of time, and is/are suspected of having an attack behavior, and therefore the SEDF determines that there is a security event.

The session modification request message includes a UE identifier (UE ID) and a control policy. The UE identifier is used to indicate identity information of the UE, and the control policy is used to limit a data connection of the UE to a destination IP address or a destination MAC address. The control policy includes the destination IP address or the destination MAC address. Optionally, the control policy may further include a source IP address or a source MAC address.

Step 402. The PCF generates a packet filter and indication information.

For a specific implementation method for generating, by the PCF, the packet filter based on the received control policy, refer to related descriptions in step 202 in the embodiment in FIG. 2.

The PCF further generates the indication information, where the indication information is used to indicate to discard a data packet matching the packet filter. The indication information is finally sent to the UE, and is used to indicate the UE to discard an uplink data packet matching the packet filter. In an implementation, the indication information may be 1-bit information. In another implementation, the indication information may be a specific 5G QoS indicator (5QI), and the specific 5QI may be pre-agreed on by the UE and a network side.

Step 403. The PCF initiates sending of a session policy association modification message to an SMF, where the message includes the UE identifier, the packet filter, and the indication information.

Step 404. The SMF sends a notification message to an AMF, where the notification message includes the UE identifier, the packet filter, and the indication information.

For example, the notification message may be a Namf_Communication_N1N2MessageTransfer message.

Step 405. After receiving the notification message, the AMF sends an acknowledgment (ACK) message to the SMF.

Step 406. The AMF delivers an N2 session request message to a base station, where the message includes the UE identifier, the packet filter, and the indication information.

Step 407. The base station initiates signaling exchange with the UE, and the base station sends a resource modification request message to the UE, where the message includes the packet filter and the indication information.

Because the base station receives the indication information from the AMF, the base station chooses not to initiate a radio resource control (RRC) connection reconfiguration procedure, but sends the resource modification request message to the UE.

Step 408. The UE updates a QoS rule based on the packet filter and the indication information.

One UE may include one or more QoS rules, and one QoS rule includes: one QFI, one packet filter set, and priority value information corresponding to the packet filter set. The QFI is used to identify a QoS flow, one packet filter set includes one or more packet filters, and the priority value information is used to indicate a priority of using the packet filter set, or is understood as indicating a priority of using the QoS rule.

The UE determines mapping between uplink user-plane traffic and a QoS flow according to a stored QoS rule. The UE matches an uplink PDU (that is, an uplink data packet) with a packet filter in the QoS rule. If one uplink PDU matches a packet filter in one QoS rule, the UE marks the uplink PDU with a QFI in the QoS rule. In addition, uplink PDUs marked with a same QFI form a QoS flow. Then, the UE sends the QoS flow on an access network resource corresponding to the QoS flow. Alternatively, it is understood as that the UE performs matching on uplink user-plane traffic according to a QoS rule. If the matching succeeds, the UE marks the uplink user-plane traffic with a QFI in the QoS rule, to obtain a QoS flow. Therefore, the uplink user-plane traffic is mapped to a plurality of QoS flows after being matched according to different QoS rules. Different QoS flows have different QFIs.

A method for updating, by the UE, the stored QoS rule based on the received packet filter and indication information may be as follows: The UE regenerates a QoS rule based on the received packet filter and indication information, where the QoS rule includes a specific QFI, the received packet filter, and priority information. The specific QFI may be a pre-agreed QFI, or may be a QFI generated based on the indication information. The priority information is usually set to a high priority, and for example, the priority information is set to a priority 1. Further, the received packet filter may be deleted from the currently stored QoS rule. The following describes two cases with reference to specific examples.

In an example, QoS rules that are before update and that are stored in the UE include the following information:
QoS rule 1: a QFI 1, a packet filter set 1 (including a packet filter 1 and a packet filter 2), and a priority 1;
QoS rule 2: a QFI 2, a packet filter set 2 (including a packet filter 3 and a packet filter 4), and a priority 2; and QoS rule 3: a QFI 3, a packet filter set 3 (a packet filter 5), and a priority 3.

The priority 1 is higher than the priority 2, and the priority 2 is higher than the priority 3.

In an example, if packet filters received by the UE are the packet filter 1 and the packet filter 4, the UE regenerates a QoS rule 4 based on the packet filter 1, the packet filter 4, and the indication information. The QoS rule 4 includes a QFI 4, a packet filter set 4 (including the packet filter 1 and the packet filter 4), and the priority 1. In addition, the packet filter 1 in the packet filter set 1 of the QoS rule 1 and the packet filter 4 in the packet filter set 2 of the QoS rule 2 are deleted. The QFI 4 is a specific QFI. For example, when the indication information received by the UE from the base station is a specific 5QI, the QFI 4 may be the specific 5QI, or the QFI 4 is generated based on the specific 5QI.

Therefore, updated QoS rules are as follows:
QoS rule 1: the QFI 1, the packet filter set 1 (including the packet filter 2), and the priority 1;
QoS rule 2: the QFI 2, the packet filter set 2 (including the packet filter 3), and the priority 2;
QoS rule 3: the QFI 3, the packet filter set 3 (the packet filter 5), and the priority 3; and
QoS rule 4: the QFI 4, the packet filter set 4 (including the packet filter 1 and the packet filter 4), and the priority 1.

Step 409. When the UE needs to send an uplink data packet, the UE performs matching on the uplink data packet according to the updated QoS rule, and if the uplink data packet matches the packet filter in the updated QoS rule, the UE discards the uplink data packet.

For example, the UE generates uplink data when an application of the UE is used, and generates a plurality of uplink data packets. When the uplink data packets need to be sent, matching needs to be performed on each uplink data packet according to a QoS rule in the UE, and then a corresponding QFI is allocated to the uplink data packet.

An example in which the QoS rule stored in the UE is the updated QoS rule in the foregoing example is used below for description.

For example, if an uplink data packet 1 to an uplink data packet 100 that are generated by the UE match the packet filter 2 of the QoS rule 1, the UE marks the uplink data packet 1 to the uplink data packet 100 with the QFI 1. If an uplink data packet 101 to an uplink data packet 300 that are generated by the UE match the packet filter 3 of the QoS rule 2, the UE marks the uplink data packet 101 to the uplink data packet 300 with the QFI 2. If an uplink data packet 301 to an uplink data packet 500 that are generated by the UE match the packet filter 1 of the QoS rule 4, the UE marks the uplink data packet 301 to the uplink data packet 500 with the QFI 4.

When the UE sends uplink data packets, for the uplink data packets marked with the QFI 1, the QFI 2, and the QFI 3, the UE allocates access network resources to these uplink data packets, and sends these uplink data packets on the allocated access network resources. Therefore, the UE sends the uplink data packet 1 to the uplink data packet 100, and sends the uplink data packet 101 to the uplink data packet 300.

For uplink data packets marked with a specific QFI such as the QFI 4, the UE does not allocate access network resources to these uplink data packets. Therefore, the UE discards these uplink data packets. Therefore, the UE discards the uplink data packet 301 to the uplink data packet 500.

Optionally, the UE may alternatively start a timer after updating the QoS rule. After the timer expires, the UE re-initiates a PDU session modification procedure, to request to allocate an access network resource to a QoS flow indicated by a specific QFI in the QoS rule. The allocated access network resource is used to transmit a data packet of the QoS flow. In other words, for the QoS flow indicated by the specific QFI, the network side does not allocate an access network resource to the QoS flow before the timer expires. Therefore, the UE discards an uplink data packet of the QoS flow. After the timer expires, the UE requests the network side to allocate an access network resource to the QoS flow, to transmit an uplink data packet of the QoS flow.

Step 410. The UE sends an acknowledgment message to the base station.

In an example, in step 408, if QFIs in all QoS rules of the updated QoS rule of the UE are each the specific QFI, it means that all uplink data packets of the UE are to be discarded. For example, QoS rules that are before update and that are stored in the UE include the following information:
QoS rule 1: a QFI 1, a packet filter set 1 (including a packet filter 1 and a packet filter 2), and a priority 1;
QoS rule 2: a QFI 2, a packet filter set 2 (including a packet filter 3 and a packet filter 4), and a priority 2; and
QoS rule 3: a QFI 3, a packet filter set 3 (including a packet filter 5), and a priority 3.

Packet filters received by the UE from the network side in step 407 are the packet filter 1, the packet filter 2, the packet filter 3, the packet filter 4, and the packet filter 5, and an updated QoS rule in the UE is:
QoS rule: a QFI 4, a packet filter set (including the packet filter 1, the packet filter 2, the packet filter 3, the packet filter 4, and the packet filter 5), and the priority 1.

Because all packet filters in the UE correspond to a same QFI, and the QFI is a specific QFI, all uplink data packets of the UE are discarded, that is, are not sent to a UPF. Therefore, the UE may request the network side to release a PDU session. For example, the UE may include notification information in the acknowledgment message sent to the base station, where the notification information is used to indicate to release the PDU session.

Step 411. The base station releases the PDU session based on the indication information.

This step is an optional step. If the acknowledgment message sent by the UE includes the notification information, the base station initiates a PDU session release procedure, to release the PDU session.

In this embodiment, based on the PDU session modification procedure, the packet filter and the indication information are delivered from the network side to a UE side, to implement connection control on the UE side, and block a connection near a source (that is, block the connection from the UE), thereby reducing traffic exchanged between the UE and the UPF. Compared with the background technical solution shown in FIG. 2, in this embodiment of this application, the UE implements traffic control, to reduce a quantity of uplink data packets sent to the UPF, thereby reducing load of the UPF, and reducing air interface resources between the UE and the base station and link resources between the base station and the UPF.

In an implementation method 2, the UE receives a NAS message from an AMF, where the NAS message includes the packet filter.

Based on this implementation method, the UE may receive the packet filter by using the NAS message, and then the UE directly discards an uplink data packet matching the packet filter.

The following provides a specific embodiment of the implementation method with reference to an accompanying drawing.

Figure 5:
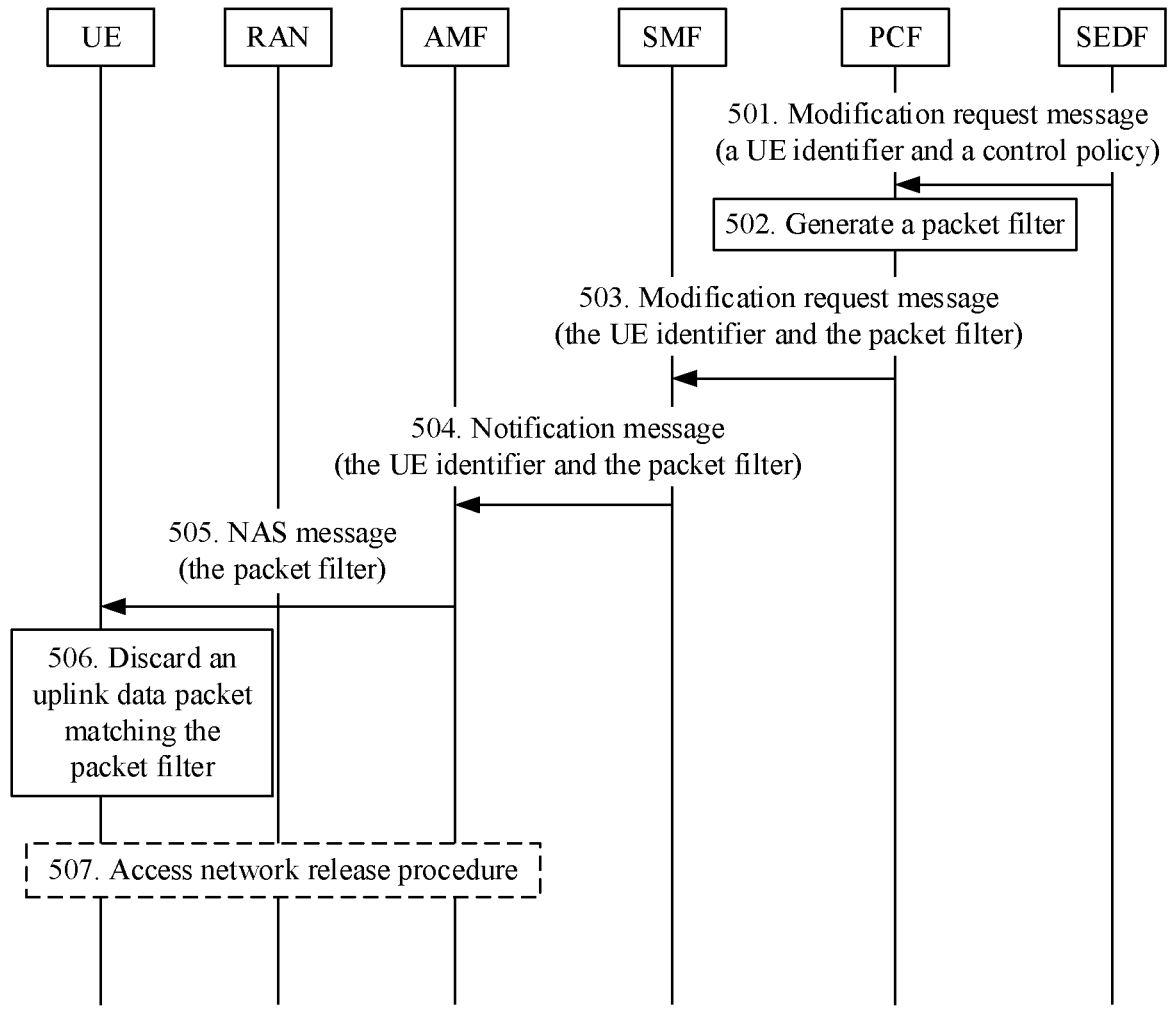
FIG. 5 is a schematic diagram of still another method for controlling a connection between a terminal and a network according to this application.

FIG. 5 shows still another method for controlling a connection between UE and a network according to this application. The method may be used to control single UE. In this embodiment, a network side sends a packet filter to the UE by using a NAS message, and creates a data packet blacklist on a UE side to discard a data packet.

The method includes the following steps.

Step 501. An SEDF sends a modification request message to a PCF when the SEDF detects a security event.

This step is the same as step 401 in the embodiment shown in FIG. 4, and reference may be made to the foregoing descriptions.

Step 502. The PCF generates the packet filter.

This step is the same as the method for generating, by the PCF, a packet filter in step 402 in the embodiment shown in FIG. 4, and reference may be made to the foregoing descriptions.

Step 503. The PCF sends a modification request message to an SMF, where the message includes a UE identifier and the packet filter.

Step 504. The SMF sends a notification message to an AMF, where the message includes the UE identifier and the packet filter.

Step 505. The AMF sends the NAS message to the UE, where the message includes the packet filter.

It may be understood as that the NAS message is used to indicate the UE to discard an uplink data packet matching the packet filter. Optionally, the NAS message may further include indication information, and the indication information is used to indicate the UE to discard the uplink data packet matching the packet filter.

Step 506. The UE discards the uplink data packet matching the packet filter.

For example, in an implementation, the UE may denote the packet filter received by using the NAS message in step 505 as PF1. The UE denotes an original packet filter set used for QoS rules mapping as PF2. When the UE needs to match an uplink data packet with a packet filter, the UE first performs matching by using a packet filter in PF1. If the matching succeeds, the UE discards the uplink data packet. If the matching fails, the UE performs matching on the uplink data packet by using PF2. If the matching succeeds, the uplink data packet is marked with a corresponding QFI, that is, the uplink data packet is mapped to a corresponding QoS flow, and then a normal uplink PDU is transmitted on a radio access resource corresponding to the QoS flow, that is, a normal QoS flow is sent to a UPF by using an uplink PDU session.

Step 507. If uplink data packets of the UE are all discarded after being matched with PF1 within a specified time, the UE may initiate an access network release (AN release) procedure in which the UE enters an idle state from a connected state.

Step 507 is an optional step.

In an alternative implementation, in the embodiment shown in FIG. 5, the PCF may directly send a UE identifier and the packet filter to an AMF. Then, the AMF may send the packet filter to the UE through the base station by using a radio resource control (RRC) message.

In the foregoing embodiment, the packet filter is delivered from a network side to a UE side by using the NAS message, to implement connection control on the UE side, and block a connection near a source (that is, block the connection from the UE), thereby reducing traffic exchanged between the UE and the UPF, and reducing air interface resources between the UE and the base station and link resources between the base station and the UPF. Compared with the background technical solution shown in FIG. 2, in this embodiment of this application, the UE implements traffic control, to reduce a quantity of uplink data packets sent to the UPF, thereby reducing load of the UPF.

In an implementation method 3, the UE receives a broadcast message from a base station, where the broadcast message includes a group identifier and the packet filter. If determining that a group identifier of the UE matches the group identifier of the broadcast message, the UE discards the uplink data packet matching the packet filter.

Based on the implementation method, it may be implemented that the UE is controlled to discard uplink data packets by group.

The following provides a specific embodiment of the implementation method with reference to an accompanying drawing.

Figure 6:
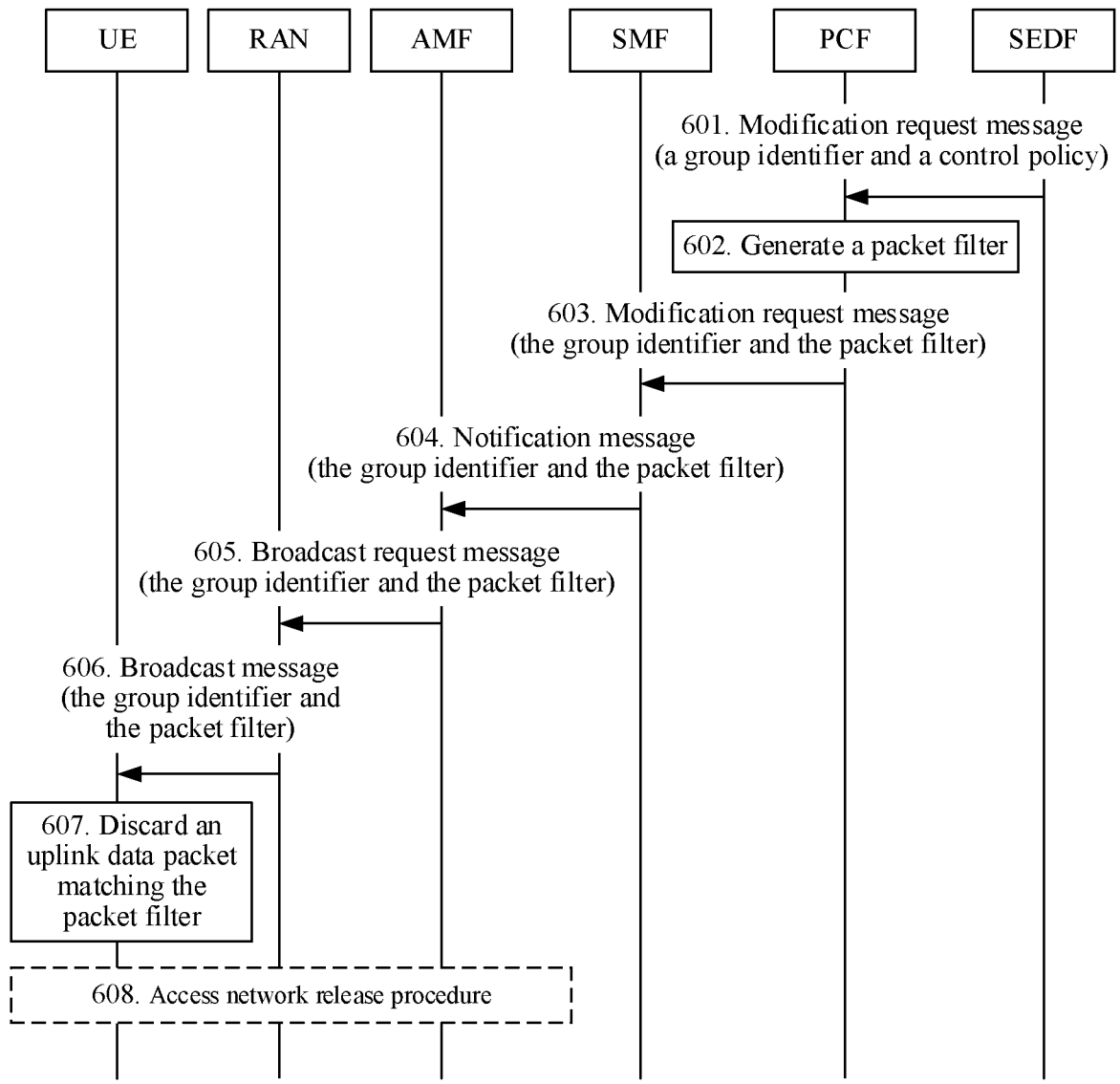
FIG. 6 is a schematic diagram of still another method for controlling a connection between a terminal and a network according to this application.

FIG. 6 shows still another method for controlling a connection between UE and a network according to this application. The method may be used to control one or more groups of UEs. In this embodiment, a network side sends a packet filter to the UE through broadcast, and creates a data packet blacklist on a UE side to discard a data packet.

The method includes the following steps.

Step 601. An SEDF sends a modification request message to a PCF when the SEDF detects a security event.

That the SEDF detects a security event means that, for example, the SEDF detects that UE or some UEs abnormally accesses/access an IP address or some IP addresses, for example, the UE or some UEs frequently accesses/access an IP address within a short period of time, and is/are suspected of having an attack behavior, and in this way, the SEDF determines that there is the security event.

When detecting that a plurality of terminals belonging to a same group have an abnormal behavior, the SEDF may send a session modification request message to the PCF. The session modification request message includes a group identifier (group ID) and a control policy. The group identifier is used to indicate group information corresponding to a group to which the UE belongs, and the control policy is used to limit a data connection of the UE to a destination IP address or a destination MAC address. The control policy includes the destination IP address or the destination MAC address. Optionally, the control policy may further include a source IP address or a source MAC address.

In a possible implementation, when the SEDF detects that the plurality of terminals belonging to the same group have the abnormal behavior, and a quantity of the terminals having the abnormal behavior in the group or a ratio of the terminals having the abnormal behavior to all terminals in the group is greater than a preset threshold (that is, a sufficient quantity of terminals in the group have the abnormal behavior), the SEDF may send the session modification request message including a group identifier of the group and the control policy to the PCF.

There may be one or more group identifiers in the modification request message.

In an implementation, the SEDF may send all group information in which an abnormal behavior is detected to the PCF, and the PCF implements, based on the group information, access control on a terminal matching the group information. In still another implementation, the SEDF may alternatively send only some group information in all the obtained group information to the PCF. For example, if 100 pieces of group information are obtained, according to a preset proportion such as 30%, the top 30% of group information corresponding to groups including a largest quantity of UEs in the 100 pieces of group information may be sent to the PCF. Alternatively, according to a preset fixed quantity such as 50, the first 50 pieces of group information corresponding to groups including a largest quantity of UEs in the 100 pieces of group information may be sent to the PCF. The PCF performs, based on the group information, access control on a terminal matching the group information.

Step 602. The PCF generates the packet filter.

This step is the same as the method for generating, by the PCF, a packet filter in step 402 in the embodiment shown in FIG. 4, and reference may be made to the foregoing descriptions.

Step 603. The PCF sends a modification request message to an SMF, where the message includes the group identifier and the packet filter.

The PCF sends, to the SMF by using the modification request message, the group identifier received from the SEDF and the packet filter generated by the PCF.

Step 604. The SMF sends a notification message to an AMF, where the message includes the group identifier and the packet filter.

The SMF sends the group identifier and the packet filter that are received from the PCF to the AMF by using the notification message.

Step 605. The AMF sends a broadcast request message to a base station, where the message includes the group identifier and the packet filter.

The AMF sends the group identifier and the packet filter that are received from the SMF to the base station by using the broadcast request message. The broadcast request message is used to request the base station to send a broadcast message.

Step 606. The base station sends the broadcast message, where the message includes the group identifier and the packet filter.

The base station broadcasts, by using the broadcast message, the group identifier and the packet filter that are received from the AMF.

Step 607. The UE receives the broadcast message, and if the UE belongs to a group identified by the group identifier, the UE discards an uplink data packet matching the packet filter.

After receiving the broadcast message, the UE obtains the group identifier and the packet filter in the broadcast message, and then first determines, based on the group identifier stored in the UE, whether the group identifier matches the group identifier in the broadcast message (that is, determines whether the group identifiers are the same). If the group identifier matches the group identifier in the broadcast message, the UE may denote the packet filter obtained from the broadcast message as PF1. The UE denotes an original packet filter set used for QoS rules mapping as PF2. When the UE needs to match an uplink data packet with a packet filter, the UE first performs matching by using a packet filter in PF1. If the matching succeeds, the UE discards the uplink data packet. If the matching fails, the UE performs matching on the uplink data packet by using PF2. If the matching succeeds, the uplink data packet is marked with a corresponding QFI, that is, the uplink data packet is mapped to a corresponding QoS flow, and then a normal uplink PDU is transmitted on a radio access resource corresponding to the QoS flow, that is, a normal QoS flow is sent to a UPF.

Step 608. If uplink data packets of the UE are all discarded after being matched with PF1 within a specified time, the UE may initiate an access network release (AN release) procedure in which the UE enters an idle state from a connected state.

Step 608 is an optional step.

In the foregoing embodiment, the group identifier and the packet filter are sent to the UE by using the broadcast message, and connection control is performed on one or more groups of UEs in a group control manner, to block a connection near a source (that is, block the connection from the UE), thereby reducing traffic exchanged between the UE and the UPF. Compared with the background technical solution shown in FIG. 2, in this embodiment of this application, the UE implements traffic control, to reduce a quantity of uplink data packets sent to the UPF, thereby reducing load of the UPF. In addition, signaling exchange can be simplified because of group control, and an amount of signaling exchanged during overload can be reduced.

The foregoing mainly describes the solutions provided in this application from a perspective of interaction between network elements. It may be understood that, in the foregoing implementations, to implement the foregoing functions, each network element includes a corresponding hardware structure and/or software module for performing each function. A person skilled in the art should easily be aware that, in combination with the examples described in the embodiments disclosed in this specification, units and algorithm steps may be implemented by hardware or a combination of hardware and computer software in the present application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present application.

Figure 7:
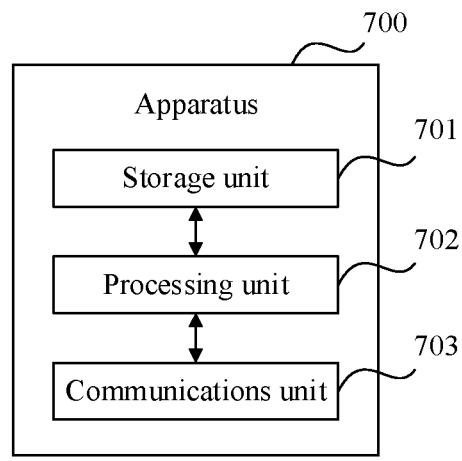
FIG. 7 is a schematic diagram of an apparatus according to this application.

FIG. 7 is a possible example block diagram of an apparatus according to an embodiment of the present application. The apparatus 700 may exist in a form of software, or may exist in a form of hardware, or may exist in a form of software and hardware. This is not limited in this embodiment of this application. The apparatus 700 may include a processing unit 702 and a communications unit 703. In an implementation, the communications unit 703 may include a receiving unit and/or a sending unit. The processing unit 702 is configured to control and manage the apparatus 700. The communications unit 703 is configured to support the apparatus 700 in communicating with another network entity. The apparatus 700 may further include a storage unit 701, configured to store program code and data of the apparatus 700.

The processing unit 702 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various example logical blocks, modules, and circuits described with reference to content disclosed in the embodiments of the present application. The processor may alternatively be a combination of processors implementing a computing function, for example, a combination including one or more microprocessors, or a combination of a DSP and a microprocessor. The communications unit 703 may be a communications interface, a transceiver, a transceiver circuit, or the like. The communications interface is a general term. During specific implementation, the communications interface may include a plurality of interfaces. The storage unit 701 may be a memory.

In a first application, the apparatus 700 may be the access network device in any one of the foregoing embodiments, or may be a chip in the access network device. For example, when the apparatus 700 is the access network device, the processing unit 702 may be, for example, a processor, the communications unit may be, for example, a transceiver, and the transceiver includes a radio frequency circuit. Optionally, the storage unit may be, for example, a memory. For example, when the apparatus 700 is the chip in the access network device, the processing unit 702 may be, for example, a processor, and the communications unit may be, for example, an input/output interface, a pin, or a circuit. The processing unit 702 may execute a computer-executable instruction stored in the storage unit. Optionally, the storage unit is a storage unit inside the chip, such as a register or a buffer. Alternatively, the storage unit may be a storage unit that is in the access network device and that is located outside the chip, such as a read-only memory (ROM) or another type of static storage device that can store static information and an instruction, or a random access memory (RAM).

Specifically, when the communications unit 703 includes the sending unit and the receiving unit, the receiving unit is configured to receive a packet filter and a group identifier, and the sending unit is configured to send a broadcast message to a terminal. The broadcast message includes the packet filter and the group identifier, and the broadcast message is used to indicate the terminal to discard, when the group identifier matches a group identifier of the terminal, an uplink data packet matching the packet filter.

In a possible implementation, the receiving unit is specifically configured to receive the packet filter and the group identifier from a policy control network element.

In a second application, the apparatus 700 may be the terminal in any one of the foregoing embodiments, or may be a chip in the terminal. For example, when the apparatus 700 is the terminal, the processing unit 702 may be, for example, a processor, the communications unit may be, for example, a transceiver, and the transceiver includes a radio frequency circuit. Optionally, the storage unit may be, for example, a memory. For example, when the apparatus 700 is the chip in the terminal, the processing unit 702 may be a processor, and the communications unit may be, for example, an input/output interface, a pin, or a circuit. Optionally, the storage unit is a storage unit inside the chip, such as a register or a buffer. Alternatively, the storage unit may be a storage unit that is in the terminal and that is located outside the chip, such as a ROM or another type of static storage device that can store static information and an instruction, or a RAM.

Specifically, when the communications unit 703 includes the sending unit and the receiving unit, the receiving unit is configured to receive a packet filter and the processing unit is configured to discard an uplink data packet matching the packet filter.

In a possible implementation, the receiving unit is specifically configured to receive the packet filter and indication information, where the indication information is used to indicate to discard the uplink data packet matching the packet filter. The processing unit is further configured to allocate a specific QFI to the packet filter based on the indication information. That the processing unit is configured to discard an uplink data packet matching the packet filter specifically includes: marking the uplink data packet with the specific QFI if determining that the uplink data packet matches the packet filter; and discarding the uplink data packet corresponding to the specific QFI.

In a possible implementation, the indication information is a specific 5QI, and the specific QFI is the specific 5QI or the specific QFI is generated based on the specific 5QI.

In a possible implementation, the processing unit is further configured to: update a QoS rule of the terminal based on the packet filter and the specific QFI after allocating the specific QFI to the packet filter based on the indication information. The sending unit is configured to: send notification information to an access network device when each QFI corresponding to a packet filter in the updated QoS rule is the specific QFI, where the notification information is used to indicate to release a protocol data unit PDU session.

In a possible implementation, the processing unit is further configured to: start a timer after allocating the specific QFI to the packet filter based on the indication information; and initiate a PDU session modification procedure after the timer expires, to request to allocate an access network resource to a QoS flow indicated by the specific QFI, where the allocated access network resource is used to transmit a data packet of the QoS flow.

In a possible implementation, the receiving unit is specifically configured to receive a NAS message from a mobility management network element, where the NAS message includes the packet filter.

In a possible implementation, the receiving unit is specifically configured to receive a broadcast message from an access network device, where the broadcast message includes a group identifier and the packet filter. That the processing unit is configured to discard an uplink data packet matching the packet filter specifically includes: discarding, if determining that a group identifier of the terminal matches the group identifier of the broadcast message, the uplink data packet matching the packet filter.

In a third application, the apparatus 700 may be the policy control network element in any one of the foregoing embodiments, or may be a chip in the policy control network element. For example, when the apparatus 700 is the policy control network element, the processing unit 702 may be, for example, a processor, the communications unit may be, for example, a transceiver, and the transceiver includes a radio frequency circuit. Optionally, the storage unit may be, for example, a memory. For example, when the apparatus 700 is the chip in the policy control network element, the processing unit 702 may be, for example, a processor, and the communications unit may be, for example, an input/output interface, a pin, or a circuit. Optionally, the storage unit is a storage unit inside the chip, such as a register or a buffer. Alternatively, the storage unit may be a storage unit that is in the policy control network element and that is located outside the chip, such as a ROM or another type of static storage device that can store static information and an instruction, or a RAM.

Specifically, when the communications unit 703 includes the sending unit and the receiving unit, the processing unit is configured to generate a packet filter, and the sending unit is configured to send the packet filter to a terminal, to indicate the terminal to discard an uplink data packet matching the packet filter.

In a possible implementation, the receiving unit is configured to: receive a control policy and a group identifier from a security detection network element before the sending unit sends the packet filter to the terminal. The processing unit is specifically configured to generate the packet filter based on the control policy. The sending unit is specifically configured to send the packet filter and the group identifier to the terminal, to indicate the terminal to discard, when the group identifier matches a group identifier of the terminal, an uplink data packet matching the packet filter.

When the apparatus shown in FIG. 7 is the terminal, the access network device, or the policy control network element, for specific beneficial effects of the method for controlling a connection between a terminal and a network, refer to related descriptions in the foregoing method embodiments. Details are not described herein again.

Figure 8:
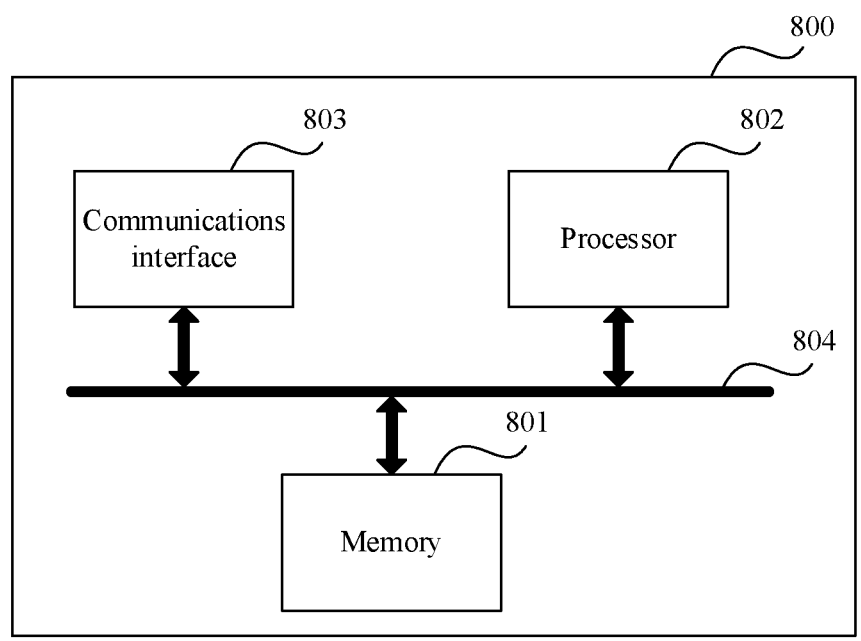
FIG. 8 is a schematic diagram of an apparatus according to this application.

FIG. 8 is a schematic diagram of an apparatus according to this application. The apparatus may be the foregoing terminal, access network device, or policy control network element. The apparatus 800 includes a processor 802, a communications interface 803, and a memory 801. Optionally, the apparatus 800 may further include a bus 804. The communications interface 803, the processor 802, and the memory 801 may be connected to each other by using the bus 804. The communications line 804 may be a peripheral component interconnect (PCI) bus, an extended industry standard architecture (EISA) bus, or the like. The communications line 804 may be classified into an address bus, a data bus, a control bus, and the like. For ease of representation, only one thick line is used to represent the bus in FIG. 8, but this does not mean that there is only one bus or only one type of bus.

The processor 802 may be a CPU, a microprocessor, an ASIC, or one or more integrated circuits configured to control program execution in the solutions of this application.

The communications interface 803 is configured to communicate with another device or a communications network such as Ethernet, a radio access network (RAN), a wireless local area network (WLAN), or a wired access network by using any apparatus such as a transceiver.

The memory 801 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, optical disc storage medium (including a compressed optical disc, a laser disc, an optical disc, a digital versatile disc, a Blu-ray disc, or the like), or magnetic disk storage medium or another magnetic storage device, or any other medium that can be used to carry or store expected program code in a form of an instruction or a data structure and that can be accessed by a computer, but is not limited thereto. The memory may exist independently and is connected to the processor by using the communications line 804. Alternatively, the memory may be integrated with the processor.

The memory 801 is configured to store a computer-executable instruction for executing the solutions of this application, and the processor 802 controls the execution. The processor 802 is configured to execute the computer-executable instruction stored in the memory 801, to implement the method for controlling a connection between a terminal and a network provided in the foregoing embodiments of this application.

Optionally, the computer-executable instruction in the embodiments of this application may also be referred to as application program code. This is not specifically limited in the embodiments of this application.

A person of ordinary skill in the art may understand that various reference numerals such as "first" and "second" in this application are merely used for differentiation for ease of description, and are not used to limit the scope of the embodiments of this application, or represent a sequence. "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. "At least one" means one or more. At least two means two or more. "At least one", "any one", or a similar expression thereof means any combination of these items, including a singular item (piece) or any combination of plural items (pieces). For example, at least one (piece, or type) of a, b, or c may indicate: a, b, c, a and b, a and c, b and c, or a, b, and c, where a, b, and c may be singular or plural.

All or some of the foregoing embodiments may be implemented by software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. Alternatively, the processor may be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Alternatively, the storage medium may be integrated into the processor. The processor and the storage medium may be disposed in an ASIC, and the ASIC may be disposed in a terminal. Alternatively, the processor and the storage medium may be disposed in different components of a terminal.

These computer program instructions may alternatively be loaded onto a computer or another programmable data processing device, so that a series of operations and steps are performed on the computer or the other programmable data processing device, thereby generating computer-implemented processing. Therefore, the instructions executed on the computer or the other programmable data processing device provide steps for implementing a specific function in one or more procedures in the flowcharts and/or in one or more blocks in the block diagrams.

Although this application is described with reference to specific features and the embodiments thereof, it is clear that various modifications and combinations may be made to this application without departing from the scope of this application. Correspondingly, the specification and the accompanying drawings are merely examples for description of this application defined by the appended claims, and are considered as any or all of modifications, variations, combinations, or equivalents that cover the scope of this application. Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
    receiving, by a communication apparatus, a packet filter and indication information, wherein the indication information indicates to discard an uplink data packet matching the packet filter;
    allocating, by the communication apparatus, a specific quality of service flow identifier (QFI) to the packet filter based on the indication information; and
    discarding, by the communication apparatus, the uplink data packet matching the packet filter by
        marking, by the communication apparatus, the uplink data packet with the specific QFI if the uplink data packet matches the packet filter; and
        discarding, by the communication apparatus, the uplink data packet corresponding to the specific QFI.

2. The method according to claim 1, wherein the indication information is a specific fifth generation quality of service (QoS) identifier (5QI), and the specific QFI is the specific 5QI, or the specific QFI is generated based on the specific 5QI.

3. The method according to claim 1, wherein after allocating, by the communication apparatus, the specific QFI to the packet filter based on the indication information, the method further comprises:
    updating, by the communication apparatus, a QoS rule of the communication apparatus based on the packet filter and the specific QFI to generate an updated QoS rule; and
    sending, by the communication apparatus, notification information to an access network device when each QFI corresponding to a packet filter in the updated QoS rule is the specific QFI, wherein the notification information indicates to release a protocol data unit (PDU) session.

4. The method according to claim 3, wherein after allocating, by the communication apparatus, the specific QFI to the packet filter based on the indication information, the method further comprises:
    updating, by the communication apparatus, a QoS rule of the communication apparatus based on the packet filter and the specific QFI to generate an updated QoS rule; and
    sending, by the communication apparatus, notification information to an access network device when each QFI corresponding to a packet filter in the updated QoS rule is the specific QFI, wherein the notification information indicates to release a protocol data unit (PDU) session.

5. The method according to claim 1, wherein after allocating, by the communication apparatus, the specific QFI to the packet filter based on the indication information, the method further comprises:
    starting, by the communication apparatus, a timer; and
    initiating, by the communication apparatus, a PDU session modification procedure after the timer expires, to request to allocate an access network resource to a QoS flow indicated by the specific QFI, wherein the allocated access network resource is used to transmit a data packet of the QoS flow.

6. The method according to claim 1, wherein receiving, by the communication apparatus, the packet filter comprises:
    receiving, by the communication apparatus, a non-access stratum (NAS) message from a mobility management network element, wherein the NAS message comprises the packet filter.

7. The method according to claim 1,
    wherein receiving, by the communication apparatus, the packet filter comprises:
    receiving, by the communication apparatus, a broadcast message from an access network device, wherein the broadcast message comprises a group identifier of the broadcast message and the packet filter; and
    discarding, by the communication apparatus, the uplink data packet matching the packet filter comprises:
    discarding, by the communication apparatus, the uplink data packet if a group identifier of the communication apparatus matches the group identifier of the broadcast message.

8. A method, comprising:
    receiving, by a policy control network element, a control policy and a group identifier from a security detection network element;
    generating, by the policy control network element, a packet filter according to the control policy; and
    sending, by the policy control network element, the packet filter and the group identifier to a communication apparatus, to indicate the communication apparatus to discard, when the group identifier matches a group identifier of the communication apparatus, an uplink data packet matching the packet filter.

9. A communications apparatus, comprising:
a processor; and
a non-transitory computer-readable medium coupled to the processor and having program instructions stored thereon which, when executed by the processor, cause the apparatus to:
receive a packet filter and indication information, wherein the indication information indicates to discard an uplink data packet matching the packet filter;
allocate a specific quality of service flow identifier (QFI) to the packet filter based on the indication information; and
discard the uplink data packet matching the packet filter by
marking, by the terminal, the uplink data packet with the specific QFI if the uplink data packet matches the packet filter; and
discarding, by the terminal, the uplink data packet corresponding to the specific QFI.

10. The apparatus according to claim 9, wherein the indication information is a specific fifth generation quality of service identifier (5QI), and the specific QFI is the specific 5QI, or the specific QFI is generated based on the specific 5QI.

11. The apparatus according to claim 9, wherein the program instructions further cause the apparatus to:
update a QoS rule of the terminal based on the packet filter and the specific QFI; and
send notification information to an access network device when each QFI corresponding to a packet filter in the updated QoS rule is the specific QFI, wherein the notification information indicates to release a protocol data unit (PDU) session.

12. The apparatus according to claim 9, wherein the program instructions further cause the apparatus to:
start a timer; and
initiate a PDU session modification procedure after the timer expires, to request to allocate an access network resource to a quality of service (QoS) flow indicated by the specific QFI, wherein the allocated access network resource is used to transmit a data packet of the QoS flow.

13. The apparatus according to claim 9, wherein the program instructions further cause the apparatus to:
receive a non-access stratum (NAS) message from a mobility management network element, wherein the NAS message comprises the packet filter.

14. The apparatus according to claim 9, wherein the program instructions further cause the apparatus to:
receive a broadcast message from an access network device, wherein the broadcast message comprises a group identifier and the packet filter; and
discard the uplink data packet matching the packet filter if a group identifier of the terminal matches the group identifier of the broadcast message.

* * * * *